(12) United States Patent
Feaviour

(10) Patent No.: US 10,350,579 B2
(45) Date of Patent: Jul. 16, 2019

(54) OXIDATION CATALYST FOR A DIESEL ENGINE EXHAUST

(71) Applicant: Johnson Matthey Public Limited Company, London (GB)

(72) Inventor: Mark Robert Feaviour, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/688,928

(22) Filed: Aug. 29, 2017

(65) Prior Publication Data

US 2018/0056278 A1    Mar. 1, 2018

(30) Foreign Application Priority Data

Aug. 30, 2016 (GB) .................................. 1614677.1

(51) Int. Cl.

| | |
|---|---|
| *B01J 21/06* | (2006.01) |
| *B01J 23/10* | (2006.01) |
| *B01J 23/34* | (2006.01) |
| *B01J 23/83* | (2006.01) |
| *B01J 35/00* | (2006.01) |
| *B01J 35/06* | (2006.01) |

(Continued)

(52) U.S. Cl.
CPC ............ *B01J 23/56* (2013.01); *B01D 53/944* (2013.01); *B01J 23/745* (2013.01); *B01J 23/8906* (2013.01); *B01J 29/06* (2013.01); *B01J 35/0006* (2013.01); *B01J 35/04* (2013.01); *F01N 3/103* (2013.01); *B01D 2255/1021* (2013.01); *B01D 2255/1023* (2013.01); *B01D 2255/2092* (2013.01); *B01D 2255/30* (2013.01); *B01D 2255/50* (2013.01); *B01D 2255/902* (2013.01); *B01D 2255/903* (2013.01); *B01D 2258/012* (2013.01)

(58) Field of Classification Search
CPC ... B01J 21/04; B01J 21/12; B01J 23/42; B01J 23/44; B01J 23/8906; B01J 29/06; B01J 35/04; B01J 35/0006
See application file for complete search history.

(56) References Cited

U.S. PATENT DOCUMENTS

| | | | |
|---|---|---|---|
| 3,867,309 A | 2/1975 | Oleck et al. | |
| 4,181,983 A * | 1/1980 | Kulkarni | ................. A61L 27/18 264/41 |

(Continued)

FOREIGN PATENT DOCUMENTS

| | | |
|---|---|---|
| DE | 19503522 A1 | 8/1996 |
| EP | 1710009 A1 | 10/2006 |

(Continued)

*Primary Examiner* — Cam N. Nguyen
(74) *Attorney, Agent, or Firm* — Gary D. Mangels

(57) ABSTRACT

An oxidation catalyst is described for treating an exhaust gas produced by a diesel engine comprising a catalytic region and a substrate, wherein the catalytic region comprises a catalytic material comprising: iron (Fe) or an oxide thereof; a platinum group metal (PGM) selected from the group consisting of (i) platinum (Pt), (ii) palladium (Pd) and (iii) platinum (Pt) and palladium (Pd); and a support material, which is a refractory oxide comprising alumina; wherein the platinum group metal (PGM) and the iron (Fe) or an oxide thereof is each supported on the support material.

19 Claims, 2 Drawing Sheets

(51) Int. Cl.
*B01J 35/08* (2006.01)
*B01J 35/10* (2006.01)
*B01J 37/00* (2006.01)
*B01J 37/02* (2006.01)
*B01J 37/03* (2006.01)
*B01J 37/04* (2006.01)
*B01J 37/10* (2006.01)
*B01J 23/56* (2006.01)
*B01D 53/94* (2006.01)
*B01J 23/745* (2006.01)
*B01J 29/06* (2006.01)
*B01J 35/04* (2006.01)
*F01N 3/10* (2006.01)
*B01J 23/89* (2006.01)

(56) References Cited

U.S. PATENT DOCUMENTS

| | | | |
|---|---|---|---|
| 4,448,895 A | 5/1984 | Ono et al. | |
| 4,711,870 A | 12/1987 | Yamada et al. | |
| 4,749,671 A | 6/1988 | Saito et al. | |
| 5,017,357 A | 5/1991 | Kolts et al. | |
| 5,643,543 A * | 7/1997 | Guibard | B01D 53/944 |
| | | | 423/213.5 |
| 6,093,670 A | 7/2000 | Brown | |
| 6,180,764 B1 | 1/2001 | Noweck et al. | |
| 6,217,837 B1 | 4/2001 | Narula et al. | |
| 7,332,454 B2 | 2/2008 | Dang et al. | |
| 7,485,271 B2 * | 2/2009 | Golunski | B01D 53/9418 |
| | | | 422/168 |
| 7,678,734 B2 * | 3/2010 | Chigapov | B01D 53/944 |
| | | | 427/229 |
| 8,066,963 B2 * | 11/2011 | Klingmann | B01D 53/944 |
| | | | 423/213.5 |
| 8,246,923 B2 * | 8/2012 | Southward | B01D 53/9468 |
| | | | 422/180 |
| 8,263,033 B2 * | 9/2012 | Dobson | B01D 53/9472 |
| | | | 422/177 |
| 8,540,952 B2 * | 9/2013 | Swallow | B01D 53/9418 |
| | | | 423/213.2 |
| 8,568,674 B1 * | 10/2013 | Sung | B01J 37/0244 |
| | | | 423/213.2 |
| 8,574,520 B2 * | 11/2013 | Koplin | B01D 53/94 |
| | | | 423/213.5 |
| 8,795,617 B2 * | 8/2014 | Swallow | B01D 53/9418 |
| | | | 423/213.2 |
| 9,005,559 B2 * | 4/2015 | Sumiya | B01J 37/0244 |
| | | | 423/213.2 |
| 9,011,809 B2 * | 4/2015 | Ito | B01J 35/04 |
| | | | 422/170 |
| 9,034,286 B2 * | 5/2015 | Bergeal | B01D 53/945 |
| | | | 423/213.5 |
| 9,140,167 B2 | 9/2015 | Bergeal et al. | |
| 9,333,461 B2 * | 5/2016 | Castagnola | B01J 35/0006 |
| 9,440,192 B2 * | 9/2016 | Hoke | B01D 53/945 |
| 9,527,034 B2 * | 12/2016 | Bergeal | B01D 53/945 |
| 9,566,568 B2 * | 2/2017 | Yin | B01J 35/0006 |
| 9,597,636 B2 * | 3/2017 | Sonntag | B01J 35/0006 |
| 9,707,542 B2 * | 7/2017 | Bergeal | B01J 37/0244 |
| 9,757,719 B2 * | 9/2017 | Fedeyko | B01J 29/85 |
| 9,849,423 B2 * | 12/2017 | Chiffey | B01D 53/9477 |
| 9,868,115 B2 * | 1/2018 | Sumiya | B01J 29/763 |
| 9,987,618 B2 * | 6/2018 | Chiffey | B01J 37/0244 |
| 2006/0030481 A1 | 2/2006 | LaBarge et al. | |
| 2007/0012028 A1 | 1/2007 | Weissman et al. | |
| 2015/0202572 A1 | 7/2015 | Chiffey et al. | |
| 2018/0065085 A1 * | 3/2018 | Chiffey | B01J 23/02 |
| 2018/0085707 A1 * | 3/2018 | Feaviour | B01D 53/9459 |

FOREIGN PATENT DOCUMENTS

| | | |
|---|---|---|
| EP | 1970118 A1 | 9/2008 |
| JP | 2005169357 A | 6/2005 |
| WO | 1999047260 A1 | 9/1999 |
| WO | 2007077462 A1 | 7/2007 |
| WO | 2011080525 A1 | 7/2011 |
| WO | 2014080220 A1 | 5/2014 |

* cited by examiner

OXIDATION CATALYST FOR A DIESEL ENGINE EXHAUST

CROSS REFERENCE TO RELATED APPLICATIONS

This application claims priority benefit to Great Britain Patent Application No. 1614677.1 filed on Aug. 30, 2016, which is incorporated herein by reference.

FIELD OF THE INVENTION

The invention relates to an oxidation catalyst and an exhaust system for treating an exhaust gas produced by a diesel engine. The invention further relates to a vehicle comprising the oxidation catalyst or the exhaust system.

BACKGROUND TO THE INVENTION

Generally, there are four classes of pollutant that are legislated against by inter-governmental organisations throughout the world: carbon monoxide (CO), unburned hydrocarbons (HCs), oxides of nitrogen ($NO_x$) and particulate matter (PM). As emissions standards for permissible emission of pollutants in exhaust gases from vehicular engines become progressively tightened, there is a need to provide improved catalysts that are able to meet these standards and which are cost-effective.

For diesel engines, an oxidation catalyst (often referred to as a diesel oxidation catalyst (DOC)) is typically used to treat the exhaust gas produced by such engines. Diesel oxidation catalysts generally catalyse the oxidation of (1) carbon monoxide (CO) to carbon dioxide ($CO_2$), and (2) HCs to carbon dioxide ($CO_2$) and water ($H_2O$). Exhaust gas temperatures for diesel engines, particularly for light-duty diesel vehicles, are relatively low (e.g. about 400° C.) and so one challenge is to develop durable catalyst formulations with low "light-off" temperatures.

The activity of oxidation catalysts, such as DOCs, is often measured in terms of its "light-off" temperature, which is the temperature at which the catalyst starts to perform a particular catalytic reaction or performs that reaction to a certain level. Normally, "light-off" temperatures are given in terms of a specific level of conversion of a reactant, such as conversion of carbon monoxide. Thus, a T50 temperature is often quoted as a "light-off" temperature because it represents the lowest temperature at which a catalyst catalyses the conversion of a reactant at 50% efficiency.

Exhaust systems for diesel engines may include several emissions control devices. Each emissions control device has a specialised function and is responsible for treating one or more classes of pollutant in the exhaust gas. The performance of an upstream emissions control device, such as an oxidation catalyst, can affect the performance of a downstream emissions control device. This is because the exhaust gas from the outlet of the upstream emissions control device is passed into the inlet of the downstream emissions control device. The interaction between each emissions control device in the exhaust system is important to the overall efficiency of the system.

Oxidation catalysts can also be formulated to oxidise some of the nitric oxide (NO) that is present in the exhaust gas to nitrogen dioxide ($NO_2$). Even though nitrogen dioxide ($NO_2$) is itself a pollutant, the conversion of NO into $NO_2$ can be beneficial. The $NO_2$ that is produced can be used to regenerate particulate matter (PM) that has been trapped by, for example, a downstream diesel particulate filter (DPF) or a downstream catalysed soot filter (CSF). Generally, the $NO_2$ generated by the oxidation catalyst increases the ratio of $NO_2$:NO in the exhaust gas from the outlet of the oxidation catalyst compared to the exhaust gas at the inlet. This increased ratio can be advantageous for exhaust systems comprising a downstream selective catalytic reduction (SCR) catalyst or a selective catalytic reduction filter (SCRF™) catalyst. The ratio of $NO_2$:NO in the exhaust gas produced directly by a diesel engine may be too low for optimum SCR or SCRF catalyst performance.

SUMMARY OF THE INVENTION

The invention provides an oxidation catalyst for treating an exhaust gas produced by a diesel engine comprising a catalytic region and a substrate, wherein the catalytic region comprises a catalytic material comprising: iron (Fe) or an oxide thereof; a platinum group metal (PGM) selected from the group consisting of (i) platinum (Pt), (ii) palladium (Pd) and (iii) platinum (Pt) and palladium (Pd); and a support material, which is a refractory oxide comprising alumina; wherein the platinum group metal (PGM) and the iron (Fe) or an oxide thereof is each supported on the support material.

The inventors have surprisingly found that the presence of iron or an oxide thereof in combination with a platinum group metal on certain support materials can provide excellent carbon monoxide (CO) and hydrocarbon (HC) oxidation activity. Advantageously, the CO and HC light off temperatures for such oxidation catalysts are very low. Additionally, the presence of iron (Fe) is not detrimental to the nitric oxide (NO) oxidation activity of the catalytic material.

The invention also relates to an exhaust system for treating an exhaust gas produced by a diesel engine. The exhaust system comprises the oxidation catalyst of the invention and optionally an emissions control device.

The invention further provides a vehicle. The vehicle comprises a diesel engine and either an oxidation catalyst or an exhaust system of the invention.

The invention also relates to the use of an oxidation catalyst to treat an exhaust gas produced by a diesel engine. The oxidation catalyst is an oxidation catalyst in accordance with the invention.

Also provided by the invention is a method of treating an exhaust gas produced by a diesel engine. The method comprises the step of passing an exhaust gas produced by a diesel engine through an exhaust system comprising the oxidation catalyst of the invention.

In the use and method aspects of the invention, it is preferable that the exhaust gas is produced by a diesel engine run on fuel, preferably diesel fuel, comprising ≤50 ppm of sulfur, more preferably ≤15 ppm of sulfur, such as ≤10 ppm of sulfur, and even more preferably ≤5 ppm of sulfur.

BRIEF DESCRIPTION OF THE DRAWINGS

FIG. 1 shows an oxidation catalyst having a first catalytic layer (2) containing iron or an oxide thereof. The first catalytic layer (2) is disposed on a second catalytic layer (3). The second catalytic layer (3) is disposed on the substrate (1).

FIG. 2 shows an oxidation catalyst having a first catalytic zone (2) containing iron or an oxide thereof. There is also a second catalytic zone (3) disposed on the substrate (1).

FIG. 3 shows an oxidation catalyst having a first catalytic zone (2) containing iron or an oxide thereof. The first catalytic zone (2) is disposed or supported on a second catalytic layer (3) at or near an inlet end of the substrate (1). The second catalytic layer (3) is disposed on the substrate (1).

FIG. 4 shows an oxidation catalyst having a first catalytic zone (2) containing iron or an oxide thereof. The first catalytic zone (2) is disposed on both a substrate (1) and a second catalytic zone (3).

FIG. 5 shows an oxidation catalyst having a first catalytic layer (2) containing iron or an oxide thereof. The first catalytic zone (2) is disposed on both a substrate (1) and a second catalytic zone (3).

DETAILED DESCRIPTION OF THE INVENTION

Figure 1:
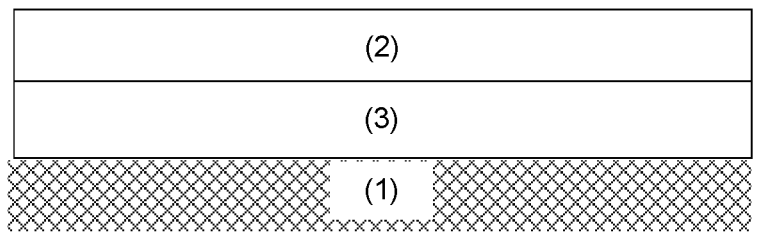
FIGS. 1 to 5 are schematic representations of oxidation catalysts of the invention. In each of the Figures, the left hand side represents an inlet end of the substrate and the right hand side represents an outlet end of the substrate.

The present invention will now be further described. The following sections relate to different parts of the oxidation catalyst of the invention and define each part in more detail. Each part or aspect of the oxidation catalyst (e.g. the catalytic region, the second catalytic region, the substrate etc.) may be combined with any other part or aspect of the oxidation catalyst unless clearly indicated to the contrary. In particular, any feature indicated as being preferred or advantageous may be combined with any other feature or features indicated as being preferred or advantageous.

Catalytic Region (First)

The oxidation catalyst of the invention comprises a catalytic region. In oxidation catalysts comprising two or more catalytic regions, the catalytic region comprising iron or an oxide thereof and a support material, which is a refractory oxide comprising alumina, is referred to herein as the "first catalytic region".

The catalytic region may comprise, or consist essentially of, a catalytic material. The catalytic material may comprise, or consist essentially of, a platinum group metal (PGM) and a support material, wherein the platinum group metal (PGM) is supported on the support material.

The iron or an oxide thereof is supported on the support material, particularly the refractory oxide thereof. The refractory oxide may also comprise iron or an oxide thereof. Small amounts of iron may be impregnated into the refractory oxide as part of the preparative method. It is preferred that the bulk of the iron is localised at the surface of the support material.

The oxide of iron may be iron (II) oxide (FeO), iron (III) oxide ($Fe_2O_3$), and/or an iron (II, III) oxide (e.g. $Fe_3O_4$, $Fe_4O_5$, $Fe_5O_6$, $Fe_5O_7$, $Fe_{25}O_{32}$, $Fe_{13}O_{19}$).

For the avoidance of doubt, when the refractory oxide comprises iron or an oxide thereof, the support material or the refractory oxide thereof is not iron or an oxide thereof (i.e. the support material or the refractory oxide thereof is not solely iron or an oxide thereof).

Typically, the support material is a particulate refractory oxide. The iron or an oxide thereof is typically dispersed over a surface of the particulate refractory oxide (e.g. supported on the refractory oxide). The iron or an oxide thereof may also be contained within the bulk particulate structure of the refractory oxide.

The iron or an oxide thereof is preferably supported on the support material. More preferably, the iron or an oxide thereof is disposed directly onto or is directly supported by the support material. The iron or an oxide thereof (e.g. particles of the iron or an oxide thereof) is typically supported on the support material by being dispersed over a surface of the support material, more preferably by being dispersed over, fixed onto a surface of and/or impregnated onto or within the support material.

It may be preferable that the iron has a mean particle size of $\geq 10$ nm, such as $\geq 12$ nm, more preferably $\geq 15$ nm. The Fe particle size can be determined by using X-ray diffraction (XRD) technique (e.g. at 25° C.) and by applying established methods relating to the broadness of the diffraction peaks to determine the crystallite size. Typically, the volume averaged column height calculated from the integral breadth is used to determine the mean particle size.

The particulate refractory oxide may be impregnated with iron or an oxide thereof. Thus, for example, particles of a mixed or composite oxide of silica-alumina, particles of alumina doped with silica may be impregnated with iron or an oxide thereof. A particulate refractory oxide may be impregnated with iron or an oxide thereof using conventional techniques that are known in the art.

In general, the first catalytic region comprises an effective amount (e.g. loading) of iron for promoting the oxidation of carbon monoxide (CO) and hydrocarbons (HCs), preferably in combination with the platinum group metal (PGM).

The first catalytic region typically comprises a total loading of iron of 1 to 500 g ft$^{-3}$ (e.g. 1 to 200 g ft$^{-3}$), such as 5 to 175 g ft$^{-3}$ (e.g. 10 to 100 g ft$^{-3}$). The loading refers to the amount of iron that is present, whether in an elemental form or as part of a compound, such as an oxide.

It is preferred that the first catalytic region comprises a total loading of iron of 10 to 100 g ft$^{-3}$, more preferably 25 to 75 g ft$^{-3}$.

Typically, the first catalytic region comprises iron (e.g. as an element or in the form of an oxide) in an amount of 0.1 to 15.0% by weight (e.g. of the refractory oxide), preferably 0.5 to 10.0% by weight (e.g. 0.75 to 5.0% by weight), more preferably 1.0 to 7.5% by weight. These ranges refer to the amount of iron in relation to the amount of the refractory oxide that is part of the support material.

The combination of iron or an oxide thereof with a refractory oxide as defined below when used in conjunction with a PGM has unexpectedly been found to provide advantageous CO and HC oxidation activity.

It is preferred that the first catalytic region comprises iron in an amount of 1.0 to 2.5% by weight (e.g. of the refractory oxide), preferably 1.25 to 2.25% by weight (e.g. 1.25. to 2.0% by weight), more preferably 1.5 to 2.0% by weight (e.g. 1.5 to 1.75% by weight). The loading refers to the amount of iron that is present, whether in an elemental form or as part of a compound, such as an oxide. As mentioned above, the relative proportion of iron to the refractory oxide can affect the oxidative activity of the catalytic material toward hydrocarbons.

The first catalytic region preferably comprises iron in an amount of 0.25 to 1.25 mol % (e.g. relative to the molar amount of the refractory oxide), preferably 0.50 to 1.10 mol % (e.g. 0.50 to 1.00 mol %), more preferably 0.60 to 0.90 mol % (e.g. 0.65 to 0.85 mol %).

The support material is a refractory oxide comprising, or consisting essentially of, alumina.

The refractory oxide may comprise, or consist essentially of, a mixed or composite oxide comprising alumina. The mixed or composite oxide comprising alumina may be selected from the group consisting of silica-alumina, ceria-alumina, titania-alumina, zirconia-alumina and alumina-magnesium oxide.

The mixed or composite oxide comprises at least 50% by weight of alumina, such as greater than 50% by weight of alumina (e.g. 55 to 95% by weight of alumina), such as at least 70% by weight of alumina, particularly at least 80% by weight of alumina.

The refractory oxide may optionally be doped (e.g. with a dopant). More preferably, the alumina may optionally be doped.

It is to be understood that any reference to "doped" in this context refers to a material where the bulk or host lattice of the refractory oxide is substitution doped or interstitially doped with a dopant. In some instances, small amounts of the dopant may be present at a surface of the refractory oxide. However, most of the dopant will generally be present in the body of the refractory oxide.

When the refractory oxide, preferably alumina, is doped, then the total amount of dopant is 0.25 to 5% by weight, preferably 0.5 to 3% by weight (e.g. about 1% by weight) of the refractory oxide or the alumina.

The refractory oxide may be doped with a dopant selected from the group consisting of silicon (Si), magnesium (Mg), barium (Ba), lanthanum (La), cerium (Ce), titanium (Ti), zirconium (Zr) and a combination of two or more thereof. It is preferred that the dopant is selected from the group consisting of silicon (Si), magnesium (Mg), barium (Ba) and cerium (Ce). More preferably, the dopant is selected from the group consisting of silicon (Si), magnesium (Mg) and barium (Ba). Even more preferably, the dopant is silicon (Si).

When the alumina is doped with a dopant comprising silicon, then preferably the alumina is doped with silica. The alumina is preferably doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

It is preferred that the refractory oxide is alumina (i.e. the refractory oxide consists essentially of alumina).

The catalytic material comprises a platinum group metal (PGM) disposed or supported on the support material. The PGM may be disposed directly onto or is directly supported by the support material (e.g. there is no intervening material between the PGM and the support material).

Typically, the PGM is dispersed on the support material (e.g. particles of the PGM are dispersed over the surface of the particulate refractory oxide). The PGM may be dispersed over particles of the iron or an oxide thereof on the support material.

The platinum group metal (PGM) is selected from the group consisting of (i) platinum (Pt), (ii) palladium (Pd) and (iii) platinum (Pt) and palladium (Pd). The platinum group metal (PGM) may be present in the catalytic material in metallic form or an oxide thereof.

The platinum group metal (PGM) may preferably be platinum. The catalytic material may comprise platinum as the only platinum group metal (PGM) and/or the only noble metal.

It has been found that advantageous oxidation activity toward carbon monoxide (CO), and hydrocarbons (HCs), particularly low CO and HC light off temperatures (T50), can be obtained when the PGM is platinum or platinum rich.

The catalytic material may comprise platinum and palladium (i.e. the platinum group metal (PGM) is platinum and palladium). Both the platinum and the palladium are disposed or supported on the support material. Particles of platinum and palladium may be dispersed over a surface of the particulate refractory oxide.

The platinum and palladium may be in the form of an alloy, preferably a bimetallic alloy. Thus, the platinum group metal (PGM) may therefore comprise, or consist essentially of, an alloy of platinum and palladium.

When the catalytic material comprises platinum and optionally palladium, then typically the ratio by weight of platinum to palladium is ≥4:1 (e.g. 1:0 to 4:1), preferably ≥6:1 (e.g. 1:0 to 6:1), such as ≥10:1 (e.g. 1:0 to 10:1), particularly >10:1, more preferably 12.5:1 (e.g. 1:0 to 12.5:1).

The platinum group metal (PGM) may preferably be palladium. The catalytic material may comprise palladium as the only platinum group metal (PGM) and/or the only noble metal.

It is preferred that the platinum group metal (PGM) is selected from the group consisting of (i) platinum (Pt) and (ii) platinum (Pt) and palladium (Pd). More preferably, the platinum group metal (PGM) is platinum (Pt).

The catalytic material typically comprises a ratio by weight of the platinum group metal (PGM), particularly platinum, to iron (Fe) of 10:1 to 1:10 (e.g. 1:1 to 1:10), preferably 4:1 to 1:7.5 (e.g. 1:1.5 to 1:7.5), more preferably 2:1 to 1:5, particularly 1:1 to 1:4.

It is preferred that the catalytic material comprises a ratio by weight of the platinum group metal (PGM), particularly platinum, to iron (Fe) of 5:1 to 1:3, more preferably 4:1 to 1:2.5 (e.g. 5:2 to 1:2), such as 2:1 to 1:2.

The catalytic region may further comprise a hydrocarbon adsorbent material. The hydrocarbon adsorbent material may be a zeolite.

It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the catalytic region comprises a hydrocarbon adsorbent, the total amount of hydrocarbon adsorbent is 0.05 to 3.00 g in$^{-3}$, particularly 0.10 to 2.00 g in$^{-3}$, more particularly 0.2 to 1.0 g in$^{-3}$. For example, the total amount of hydrocarbon adsorbent may be 0.8 to 1.75 g in$^{-3}$, such as 1.0 to 1.5 g in$^{-3}$.

In general, it is preferred that the oxidation catalyst of the invention or the catalytic region or the catalytic material is substantially free of gold. More preferably, the oxidation catalyst of the invention or the catalytic region or the catalytic material does not comprise gold.

Additionally or alternatively, the catalytic region or the catalytic material is substantially free of manganese. More preferably, the catalytic region or the catalytic material does not comprise manganese.

The catalytic region is preferably substantially free of rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the oxygen storage material)). More preferably, the catalytic region does not comprise rhodium and/or a $NO_x$ storage component comprising, or consisting essentially of, an oxide, a carbonate or a hydroxide of an alkali metal, an alkaline earth metal and/or a rare earth metal.

The catalytic region typically has a total loading of the PGM of 5 to 300 g $ft^{-3}$. It is preferred that the catalytic region has a total loading of the PGM of 10 to 250 g $ft^{-3}$ (e.g. 75 to 175 g $ft^{-3}$), more preferably 15 to 200 g $ft^{-3}$ (e.g. 50 to 150 g $ft^{-3}$), still more preferably 20 to 150 g $ft^{-3}$.

Generally, the catalytic region comprises a total amount of the support material of 0.1 to 3.0 g $in^{-3}$, preferably 0.2 to 2.5 g $in^{-3}$, still more preferably 0.3 to 2.0, and even more preferably 0.5 to 1.75 g $in^{-3}$.

The catalytic region may be disposed or supported on the substrate. It is preferred that the catalytic region is directly disposed or directly supported on the substrate (i.e. the region is in direct contact with a surface of the substrate).

The oxidation catalyst may comprise a single catalytic region. The catalytic region may be a catalytic layer (e.g. a single catalytic layer).

Alternatively, the oxidation catalyst may further comprise a second catalytic region, such as a second catalytic region described below. The catalytic region described above (i.e. the catalytic region comprising iron) is referred to below as the first catalytic region. Thus, the oxidation catalyst comprises a first catalytic region and a second catalytic region. For the avoidance of doubt, the first catalytic region is different (i.e. different composition) to the second catalytic region.

The oxidation catalyst may further comprise a third catalytic region. When the oxidation catalyst comprises a third catalytic region, the third catalytic region is different (i.e. different composition) to both the first catalytic region and the second catalytic region.

In a first arrangement, the first catalytic region is a first catalytic layer and the second catalytic region is a second catalytic layer. The first catalytic layer may be disposed or supported (e.g. directly disposed or supported) on the second catalytic layer. See, for example, FIG. 1. Alternatively, the second catalytic layer may be disposed or supported (e.g. directly disposed or supported) on the first catalytic layer. It is preferred that the first catalytic layer is disposed or supported (e.g. directly disposed or supported) on the second catalytic layer.

When the first catalytic layer is disposed or supported (e.g. directly disposed or supported) on the second catalytic layer, then the second catalytic layer may be disposed or supported (e.g. directly disposed or supported) on the substrate or on a third catalytic region, preferably a third catalytic layer. It is preferred that the second catalytic layer may be disposed or supported (e.g. directly disposed or supported) on the substrate.

When the second catalytic layer is disposed or supported (e.g. directly disposed or supported) on the first catalytic layer, then the first catalytic layer may be disposed or supported (e.g. directly disposed or supported) on the substrate or on a third catalytic region, preferably a third catalytic layer. It is preferred that the first catalytic layer may be disposed or supported (e.g. directly disposed or supported) on the substrate.

The first catalytic layer typically extends for an entire length (i.e. substantially an entire length) of the substrate, particularly the entire length of the channels of a substrate monolith.

The second catalytic layer typically extends for an entire length (i.e. substantially an entire length) of the substrate, particularly the entire length of the channels of a substrate monolith.

In the first arrangement, when the oxidation catalyst comprises a third catalytic layer, then the third catalytic layer typically extends for an entire length (i.e. substantially an entire length) of the substrate, particularly the entire length of the channels of a substrate monolith.

Figure 2:
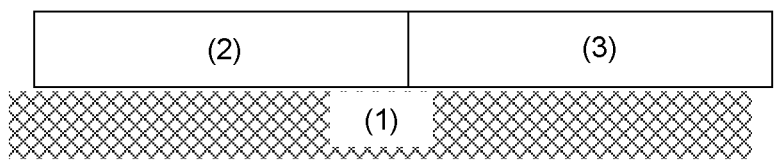

In a second arrangement, the first catalytic region is a first catalytic zone and the second catalytic region is a second catalytic zone. The first catalytic zone may be disposed upstream of the second catalytic zone. See, for example, FIG. 2. Alternatively, the second catalytic zone may be disposed upstream of the first catalytic zone. It is preferred that the first catalytic zone is disposed upstream of the second catalytic zone.

The first catalytic zone may adjoin the second catalytic zone or there may be a gap (e.g. a space) between the first catalytic zone and the second catalytic zone. Preferably, the first catalytic zone is contact with the second catalytic zone. When the first catalytic zone adjoins and/or is in contact with the second catalytic zone, then the combination of the first catalytic zone and the second catalytic zone may be disposed or supported on the substrate as a layer (e.g. a single layer). Thus, a layer (e.g. a single) may be formed on the substrate when the first and second catalytic zones adjoin or are in contact with one another. Such an arrangement may avoid problems with back pressure.

The first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Figure 6:
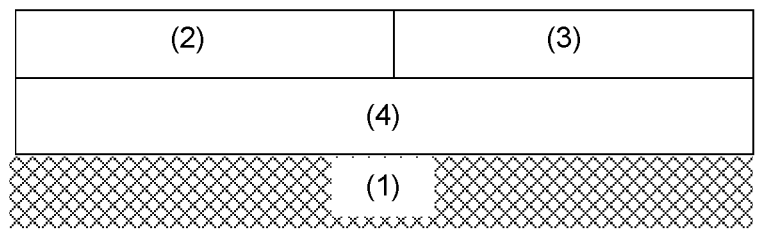
FIG. 6 shows an oxidation catalyst having a first catalytic zone (2) containing iron or an oxide thereof, and a second catalytic zone (3). The first catalytic zone (2) and the second catalytic zone (3) are disposed on a third catalytic layer (4). The third catalytic layer (4) is disposed on a substrate (1).

The first catalytic zone and the second catalytic zone may be disposed or supported (e.g. directly disposed or supported) on the substrate. Alternatively, the first catalytic zone and the second catalytic zone may be disposed or supported (e.g. directly disposed or supported) on a third catalytic region, preferably a third catalytic layer. See, for example, FIG. 6.

In the second arrangement, when the oxidation catalyst comprises a third catalytic layer, then the third catalytic layer typically extends for an entire length (i.e. substantially an entire length) of the substrate, particularly the entire length of the channels of a substrate monolith.

In a third arrangement, the first catalytic region is disposed or supported (e.g. directly disposed or supported) on the second catalytic region.

The second catalytic region may be disposed or supported (e.g. directly disposed or supported) on the substrate. Alternatively, the second catalytic region may be disposed or supported (e.g. directly disposed or supported) on a third catalytic region, preferably a third catalytic layer. It is preferred that the second catalytic region is disposed or supported (e.g. directly disposed or supported) on the substrate.

An entire length (e.g. all) of the first catalytic region may be disposed or supported (e.g. directly disposed or supported) on the second catalytic region. See, for example, FIG. 3. Alternatively, a part or portion of the length of the first catalytic region may be disposed or supported (e.g. directly disposed or supported) on the second catalytic region. A part or portion (e.g. the remaining part or portion) of the length of the first catalytic region may be disposed or supported (e.g. directly disposed or supported) on the substrate (see, for example, FIGS. 4 and 5) or a third catalytic region, preferably a third catalytic layer.

The second catalytic region may be a second catalytic layer and the first catalytic region may be a first catalytic zone. The entire length of the first catalytic zone is preferably disposed or supported on the second catalytic layer (e.g. see FIG. 3). The second catalytic layer may be disposed or supported (e.g. directly disposed or supported) on the substrate or a third catalytic layer. It is preferred that the second catalytic layer is disposed or supported (e.g. directly disposed or supported) on the substrate.

The second catalytic layer typically extends for an entire length (i.e. substantially an entire length) of the substrate, particularly the entire length of the channels of a substrate monolith.

The first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Figure 3:
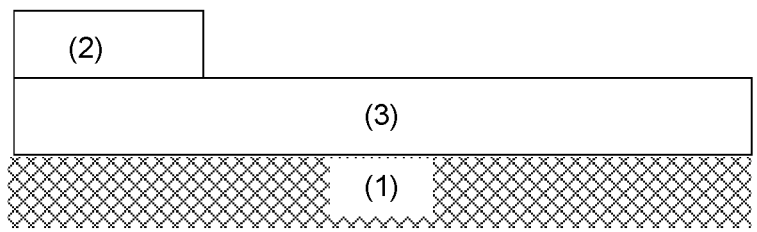

The first catalytic zone may be disposed at or near an inlet end of the substrate (e.g. as shown in FIG. 3). The first catalytic zone may be disposed at or near an outlet end of the substrate. It is preferred that the first catalytic zone is disposed at or near an inlet end of the substrate.

In an alternative third arrangement, the second catalytic region is a second catalytic zone and the first catalytic region is a first catalytic zone or a first catalytic layer. The first catalytic zone or the first catalytic layer is disposed or supported (e.g. directly disposed or supported) on the second catalytic zone. See, for example, FIGS. 4 and 5.

The second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

An entire length (e.g. all) of the second catalytic zone may be disposed or supported (e.g. directly disposed or supported) on the substrate. Alternatively, an entire length (e.g. all) of the second catalytic zone may be disposed or supported (e.g. directly disposed or supported) on the third catalytic layer.

Figure 4:
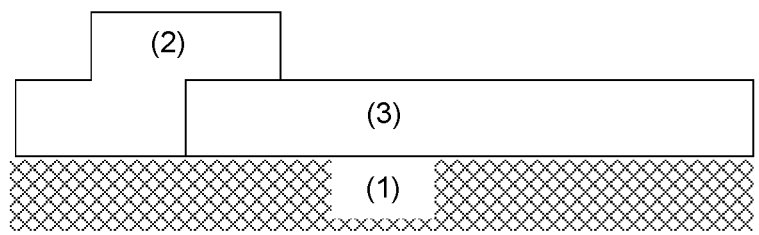
Figure 5:
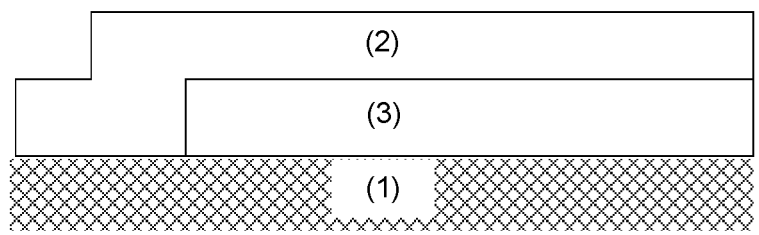

The second catalytic zone may be disposed at or near an outlet end of the substrate (e.g. as shown in FIGS. 4 and 5). The second catalytic zone may be disposed at or near an inlet end of the substrate. It is preferred that the second catalytic zone is disposed at or near an outlet end of the substrate.

In addition to being disposed or supported on the second catalytic zone, the first catalytic zone or the first catalytic layer may be disposed or supported (e.g. directly disposed or supported) on the substrate or a third catalytic layer, preferably the substrate. Thus, a part or portion of the length of the first catalytic zone or the first catalytic layer may be disposed or supported (e.g. directly disposed or supported) on the second catalytic zone and a part or portion (e.g. the remaining part or portion) of the length of the first catalytic zone or the first catalytic layer may be disposed or supported (e.g. directly disposed or supported) on the substrate or the third catalytic layer, preferably the substrate.

In the alternative third arrangement, when the first catalytic region is a first catalytic zone (e.g. as shown in FIG. 4), then the first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The first catalytic zone may be disposed at or near an inlet end of the substrate (e.g. as shown in FIG. 4). The first catalytic zone may be disposed at or near an outlet end of the substrate. It is preferred that the first catalytic zone is disposed at or near an outlet end of the substrate.

In the alternative third arrangement, when the first catalytic region is a first catalytic layer (e.g. as shown in FIG. 5), then the first catalytic layer typically extends for an entire length (i.e. substantially an entire length) of the substrate, particularly the entire length of the channels of a substrate monolith. When the first catalytic region is a first catalytic layer, then preferably the second catalytic zone is disposed at or near an outlet end of the substrate.

In a fourth arrangement, the second catalytic region is disposed or supported on the first catalytic region.

The first catalytic region may be disposed or supported (e.g. directly disposed or supported) on the substrate. Alternatively, the first catalytic region may be disposed or supported (e.g. directly disposed or supported) on a third catalytic region, preferably a third catalytic layer. It is preferred that the first catalytic region is disposed or supported (e.g. directly disposed or supported) on the substrate.

An entire length (e.g. all) of the second catalytic region may be disposed or supported (e.g. directly disposed or supported) on the first catalytic region. Alternatively, a part or portion of the length of the second catalytic region may be disposed or supported (e.g. directly disposed or supported) on the first catalytic region. A part or portion (e.g. the remaining part or portion) of the length of the second catalytic region may be disposed or supported (e.g. directly disposed or supported) on the substrate or a third catalytic region, preferably a third catalytic layer.

The first catalytic region may be a first catalytic layer and the second catalytic region may be a second catalytic zone. The entire length of the second catalytic zone is preferably disposed or supported on the first catalytic layer. The first catalytic layer may be disposed or supported (e.g. directly disposed or supported) on the substrate or a third catalytic layer. It is preferred that the first catalytic layer is disposed or supported (e.g. directly disposed or supported) on the substrate.

The first catalytic layer typically extends for an entire length (i.e. substantially an entire length) of the substrate, particularly the entire length of the channels of a substrate monolith.

The second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second catalytic zone may be disposed at or near an inlet end of the substrate (e.g. as shown in FIG. 3). The second catalytic zone may be disposed at or near an outlet end of the substrate. It is preferred that the second catalytic zone is disposed at or near an outlet end of the substrate.

In an alternative fourth arrangement, the first catalytic region is a first catalytic zone and the second catalytic region is a second catalytic zone or a second catalytic layer. The second catalytic zone or the second catalytic layer is disposed or supported (e.g. directly disposed or supported) on the first catalytic zone.

The first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

An entire length (e.g. all) of the first catalytic zone may be disposed or supported (e.g. directly disposed or supported) on the substrate. Alternatively, an entire length (e.g. all) of the first catalytic zone may be disposed or supported (e.g. directly disposed or supported) on the third catalytic layer.

The first catalytic zone may be disposed at or near an outlet end of the substrate. The first catalytic zone may be disposed at or near an inlet end of the substrate. It is preferred that the first catalytic zone is disposed at or near an inlet end of the substrate.

In addition to being disposed or supported on the first catalytic zone, the second catalytic zone or the second catalytic layer may be disposed or supported (e.g. directly disposed or supported) on the substrate or a third catalytic layer, preferably the substrate. Thus, a part or portion of the length of the second catalytic zone or the second catalytic layer may be disposed or supported (e.g. directly disposed or supported) on the first catalytic zone and a part or portion (e.g. the remaining part or portion) of the length of the second catalytic zone or the second catalytic layer may be disposed or supported (e.g. directly disposed or supported) on the substrate or the third catalytic layer, preferably the substrate.

In the alternative fourth arrangement, when the second catalytic region is a second catalytic zone, then the second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second catalytic zone may be disposed at or near an inlet end of the substrate. The second catalytic zone may be disposed at or near an outlet end of the substrate. It is preferred that the second catalytic zone is disposed at or near an outlet end of the substrate.

In the alternative fourth arrangement, when the second catalytic region is a second catalytic layer, then the second catalytic layer typically extends for an entire length (i.e. substantially an entire length) of the substrate, particularly the entire length of the channels of a substrate monolith. When the second catalytic region is a second catalytic layer, then preferably the first catalytic zone is disposed at or near an inlet end of the substrate.

As a general feature of the third arrangement or the fourth arrangement, when the oxidation catalyst comprises a third catalytic layer, the third catalytic layer typically extends for an entire length (i.e. substantially an entire length) of the substrate, particularly the entire length of the channels of a substrate monolith.

In the first to fourth arrangements above, the second catalytic region, layer or zone may have DOC activity, PNA activity or LNT activity, as described below. When the oxidation catalyst comprises a third catalytic region layer or zone, it is preferred that (i) the second catalytic region, layer or zone has DOC activity and the third catalytic region, layer or zone has either PNA activity or LNT activity or (ii) the second catalytic region, layer or zone has either PNA activity or LNT activity and the third catalytic region, layer or zone has DOC activity. More preferably, the second catalytic region, layer or zone has DOC activity and the third catalytic region, layer or zone has either PNA activity or LNT activity. Even more preferably, the second catalytic region, layer or zone has DOC activity and the third catalytic region, layer or zone has PNA activity.

The regions, zones and layers described hereinabove may be prepared using conventional methods for making and applying washcoats onto a substrate are also known in the art (see, for example, our WO 99/47260, WO 2007/077462 and WO 2011/080525).

Second Catalytic Region and/or Third Catalytic Region

The second catalytic region may be formulated to provide the oxidation catalyst with additional functionality. The presence of the first catalytic region in combination with the second catalytic region may enhance the activity of the oxidation catalyst as whole or the activity of the second catalytic region. This enhancement in activity may result from a synergistic interaction between the first catalytic region and the second catalytic region. The low CO light off temperature of the first catalytic region may generate an exotherm that is able to rapidly bring the second catalytic region up to its light off temperature.

The second catalytic region may have $NO_x$ storage activity, such as lean $NO_x$ trap (LNT) activity or passive $NO_x$ absorber (PNA) activity. Additionally or alternatively, the second catalytic region may be for oxidising hydrocarbons (HCs) and/or nitric oxide (NO) in the exhaust gas produced by the diesel engine (e.g. the second catalytic region is a diesel oxidation catalytic region).

Catalytic Region Having PNA Activity

The second or third catalytic region may have PNA activity. A passive $NO_x$ absorber (PNA) is able to store or absorb $NO_x$ at relatively low exhaust gas temperatures (e.g. less than 200° C.), usually by adsorption, and release $NO_x$ at higher temperatures. The $NO_x$ storage and release mechanism of PNAs is thermally controlled, unlike that of LNTs which require a rich purge to release stored $NO_x$.

When the second or third catalytic region has $NO_x$ storage activity (e.g. PNA activity), then the second or third catalytic region comprises, or consists essentially of, a molecular sieve catalyst comprising a noble metal and a molecular sieve, wherein the molecular sieve contains the noble metal.

The noble metal is typically selected from the group consisting of palladium (Pd), platinum (Pt) and rhodium (Rh). More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, or consists of, palladium (Pd) and optionally a second metal selected from the group consisting of platinum (Pt) and rhodium (Rh). Even more preferably, the noble metal comprises, or consists of, palladium (Pd) and optionally platinum (Pt). More preferably, the molecular sieve catalyst comprises palladium as the only noble metal.

When the noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1.

The molecular sieve catalyst may further comprise a base metal. Thus, the molecular sieve catalyst may comprise, or consist essentially of, a noble metal, a molecular sieve and optionally a base metal. The molecular sieve contains the noble metal and optionally the base metal.

The base metal may be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the molecular sieve catalyst may be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the molecular sieve catalyst may not comprise a base metal.

In general, it is preferred that the molecular sieve catalyst does not comprise a base metal.

It may be preferable that the molecular sieve catalyst is substantially free of barium (Ba), more preferably the molecular sieve catalyst is substantially free of an alkaline earth metal.

Thus, the molecular sieve catalyst may not comprise barium, preferably the molecular sieve catalyst does not comprise an alkaline earth metal.

The molecular sieve is typically composed of aluminium, silicon, and/or phosphorus. The molecular sieve generally has a three-dimensional arrangement (e.g. framework) of $SiO_4$, $AlO_4$, and/or $PO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the molecular sieve has an aluminosilicate framework, an aluminophosphate framework or a silico-aluminophosphate framework. The molecular sieve may have an aluminosilicate framework or an aluminophosphate framework. It is preferred that the molecular sieve has an aluminosilicate framework or a silico-aluminophosphate framework. More preferably, the molecular sieve has an aluminosilicate framework.

When the molecular sieve has an aluminosilicate framework, then the molecular sieve is preferably a zeolite.

The molecular sieve contains the noble metal. The noble metal is typically supported on the molecular sieve. For example, the noble metal may be loaded onto and supported on the molecular sieve, such as by ion-exchange. Thus, the molecular sieve catalyst may comprise, or consist essentially of, a noble metal and a molecular sieve, wherein the molecular sieve contains the noble metal and wherein the noble metal is loaded onto and/or supported on the molecular sieve by ion exchange.

In general, the molecular sieve may be a metal-substituted molecular sieve (e.g. metal-substituted molecular sieve having an aluminosilicate or an aluminophosphate framework). The metal of the metal-substituted molecular sieve may be the noble metal (e.g. the molecular sieve is a noble metal substituted molecular sieve). Thus, the molecular sieve containing the noble metal may be a noble metal substituted molecular sieve. When the molecular sieve catalyst comprises a base metal, then the molecular sieve may be a noble and base metal-substituted molecular sieve. For the avoidance of doubt, the term "metal-substituted" embraces the term "ion-exchanged".

The molecular sieve catalyst generally has at least 1% by weight (i.e. of the amount of noble metal of the molecular sieve catalyst) of the noble metal located inside pores of the molecular sieve, preferably at least 5% by weight, more preferably at least 10% by weight, such as at least 25% by weight, even more preferably at least 50% by weight.

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). More preferably, the molecular sieve is selected from a small pore molecular sieve and a medium pore molecular sieve.

In a first molecular sieve catalyst embodiment, the molecular sieve is a small pore molecular sieve. The small pore molecular sieve preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore molecular sieve has a Framework Type that is AEI, CHA or an AEI-CHA intergrowth. Even more preferably, the small pore molecular sieve has a Framework Type that is AEI or CHA, particularly AEI.

Preferably, the small pore molecular sieve has an aluminosilicate framework or a silico-aluminophosphate framework. More preferably, the small pore molecular sieve has an aluminosilicate framework (i.e. the molecular sieve is a zeolite), especially when the small pore molecular sieve has a Framework Type that is AEI, CHA or an AEI-CHA intergrowth, particularly AEI or CHA.

In a second molecular sieve catalyst embodiment, the molecular sieve has a Framework Type selected from the group consisting of AEI, MFI, EMT, ERI, MOR, FER, BEA, FAU, CHA, LEV, MVWV, CON and EUO, as well as mixtures of any two or more thereof.

In a third molecular sieve catalyst embodiment, the molecular sieve is a medium pore molecular sieve. The medium pore molecular sieve preferably has a Framework Type selected from the group consisting of MFI, FER, MVWV and EUO, more preferably MFI.

In a fourth molecular sieve catalyst embodiment, the molecular sieve is a large pore molecular sieve. The large pore molecular sieve preferably has a Framework Type selected from the group consisting of CON, BEA, FAU, MOR and EMT, more preferably BEA.

In each of the first to fourth molecular sieve catalyst embodiments, the molecular sieve preferably has an aluminosilicate framework (e.g. the molecular sieve is a zeolite). Each of the aforementioned three-letter codes represents a framework type in accordance with the "IUPAC Commission on Zeolite Nomenclature" and/or the "Structure Commission of the International Zeolite Association".

The molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecular having an aluminosilicate framework (e.g. a zeolite) or a silico-aluminophosphate framework, preferably an aluminosilicate framework (e.g. a zeolite).

The molecular sieve catalyst of the first molecular sieve catalyst embodiment has been found to have advantageous passive $NO_x$ adsorber (PNA) activity. The molecular sieve catalyst can be used to store $NO_x$ when exhaust gas temperatures are relatively cool, such as shortly after start-up of a lean burn engine. $NO_x$ storage by the molecular sieve catalyst occurs at low temperatures (e.g. less than 200° C.). As the lean burn engine warms up, the exhaust gas temperature increases and the temperature of the molecular sieve catalyst will also increase. The molecular sieve catalyst will release adsorbed $NO_x$ at these higher temperatures (e.g. 200° C. or above).

The second molecular sieve catalyst embodiment has cold start catalyst activity. Such activity can reduce emissions during the cold start period by adsorbing $NO_x$ and hydrocarbons (HCs) at relatively low exhaust gas temperatures (e.g. less than 200° C.). Adsorbed $NO_x$ and/or HCs can be released when the temperature of the molecular sieve catalyst is close to or above the effective temperature of the other catalyst components or emissions control devices for oxidising NO and/or HCs.

When the second or third catalytic region has PNA activity, then typically the second or third catalytic region comprises a total loading of noble metal of 1 to 250 g ft$^{-3}$, preferably 5 to 150 g ft$^{-3}$, more preferably 10 to 100 g ft$^{-3}$.

Catalytic Region Having LNT Activity

The second or third catalytic region may have LNT activity. During normal operation, a diesel engine produces an exhaust gas having a "lean" composition. An LNT comprises a $NO_x$ storage component that is able to store or trap nitrogen oxides ($NO_x$) from the exhaust gas by forming an inorganic nitrate. To release the $NO_x$ from the $NO_x$ storage component, such as when the $NO_x$ storage component is about to reach its storage capacity, the diesel engine may be run under rich conditions to produce an exhaust gas having a "rich" composition. Under these conditions, the inorganic nitrates of the $NO_x$ storage component decompose and form mainly nitrogen dioxide ($NO_2$) and some nitric oxide (NO). The LNT may contain a platinum group metal component that is able to catalytically reduce the released $NO_x$ to $N_2$ or $NH_3$ with hydrocarbons (HCs), carbon monoxide (CO) or hydrogen ($H_2$) present in the exhaust gas.

When the second or third catalytic region has $NO_x$ storage activity (e.g. LNT activity), then the second or third catalytic region comprises, or consists essentially of, a nitrogen oxides ($NO_x$) storage material. The nitrogen oxides ($NO_x$) storage material comprises, or consists essentially of, a nitrogen oxides ($NO_x$) storage component on a support material. It is preferred that the second catalytic region further comprises at least one platinum group metal (PGM). The at least one platinum group metal (PGM) may be provided by the $NO_x$ treatment material described herein below.

The $NO_x$ storage material comprises, or may consist essentially of, a $NO_x$ storage component on a support material.

The $NO_x$ storage component typically comprises an alkali metal, an alkaline earth metal and/or a rare earth metal. The $NO_x$ storage component generally comprises, or consists essentially of, (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal.

When the $NO_x$ storage component comprises an alkali metal (or an oxide, a carbonate or a hydroxide thereof), then preferably the alkali metal is selected from the group consisting of potassium (K), sodium (Na), lithium (Li), caesium (Cs) and a combination of two or more thereof. It is preferred that the alkali metal is potassium (K), sodium (Na) or lithium (Li), more preferably the alkali metal is potassium (K) or sodium (Na), and most preferably the alkali metal is potassium (K).

When the $NO_x$ storage component comprises an alkaline earth metal (or an oxide, a carbonate or a hydroxide thereof), then preferably the alkaline earth metal is selected from the group consisting of magnesium (Mg), calcium (Ca), strontium (Sr), barium (Ba) and a combination of two or more thereof. It is preferred that the alkaline earth metal is calcium (Ca), strontium (Sr), or barium (Ba), more preferably strontium (Sr) or barium (Ba), and most preferably the alkaline earth metal is barium (Ba).

When the $NO_x$ storage component comprises a rare earth metal (or an oxide, a carbonate or a hydroxide thereof), then preferably the rare earth metal is selected from the group consisting of cerium (Ce), lanthanum (La), yttrium (Y) and a combination thereof. More preferably, the rare earth metal is cerium (Ce).

Typically, the $NO_x$ storage component comprises, or consists essentially of, (i) an oxide, a carbonate or a hydroxide of a rare earth metal and/or (ii) an oxide, a carbonate or a hydroxide of an alkaline earth metal. It is preferred that the $NO_x$ storage component comprises, or consists essentially of, an oxide, a carbonate or a hydroxide of an alkaline earth metal.

It is preferred that the $NO_x$ storage component comprises barium (Ba) (e.g. an oxide, a carbonate or a hydroxide of barium (Ba)). More preferably, the $NO_x$ storage component comprises barium (e.g. an oxide, a carbonate or a hydroxide of barium (Ba)) and cerium (e.g. an oxide, a carbonate or a hydroxide of cerium (Ce), preferably ceria).

Typically, the $NO_x$ storage component is disposed or supported on the support material. The $NO_x$ storage component may be disposed directly onto or is directly supported by the support material (e.g. there is no intervening support material between the $NO_x$ storage component and the support material).

The support material generally comprises an oxide of aluminium. Typically, the support material comprises alumina. The alumina may or may not be doped with a dopant.

The alumina may be doped with a dopant selected from the group consisting of silicon (Si), magnesium (Mg), barium (Ba), lanthanum (La), cerium (Ce), titanium (Ti), zirconium (Zr) and a combination of two or more thereof. It is preferred that the dopant is selected from the group consisting of silicon (Si), magnesium (Mg), barium (Ba) and cerium (Ce). More preferably, the dopant is selected from the group consisting of silicon (Si), magnesium (Mg) and barium (Ba). Even more preferably, the dopant is magnesium (Mg).

When the alumina is doped, the total amount of dopant is 0.25 to 5% by weight, preferably 0.5 to 3% by weight (e.g. about 1% by weight) of the alumina.

In general, it is preferred that the support material comprises, or consists essentially of, an oxide of magnesium and aluminium. The oxide of magnesium and aluminium may comprise, or consist essentially of, magnesium aluminate ($MgAl_2O_4$ [e.g. spinel]) and/or a mixed oxide of magnesium oxide (MgO) and aluminium oxide ($Al_2O_3$). A mixed oxide of magnesium oxide and aluminium oxide can be prepared using methods known in the art, such as by using the processes described in U.S. Pat. No. 6,217,837 or DE 19503522 A1.

The mixed oxide of magnesium oxide (MgO) and aluminium oxide ($Al_2O_3$) typically comprises, or consists essentially of, 1.0 to 40.0% by weight of magnesium oxide (based on the total weight of the mixed oxide), such as 1.0 to 30.0% by weight, preferably 5.0 to 28.0% by weight (e.g. 5.0 to 25.0% by weight), more preferably 10.0 to 25.0% by weight of magnesium oxide.

The mixed oxide of magnesium oxide (MgO) and aluminium oxide ($Al_2O_3$) is typically a homogeneous mixed oxide of magnesium oxide (MgO) and aluminium oxide ($Al_2O_3$). In a homogeneous mixed oxide, magnesium ions occupy the positions within the lattice of aluminium ions.

Generally, a support material comprising, or consisting essentially of, a mixed oxide of magnesium oxide (MgO) and aluminium oxide ($Al_2O_3$) is preferred.

The $NO_x$ storage material may further comprise a platinum group metal (PGM). The PGM may be selected from the group consisting of platinum, palladium, rhodium and a combination of any two or more thereof. Preferably, the PGM is selected from platinum, palladium and a combination of platinum and palladium.

When the $NO_x$ storage material comprises a PGM, then generally the PGM is disposed or supported on the support material. The PGM is preferably disposed directly onto or is directly supported by the support material (e.g. there is no intervening support material between the PGM and the support material).

Typically, the second or third catalytic region further comprises a $NO_x$ treatment material. For the avoidance of doubt, the $NO_x$ treatment material is different (e.g. different composition) to the $NO_x$ storage material. The $NO_x$ treatment material may have (a) $NO_x$ storage activity and/or NO oxidative activity [e.g. under lean conditions]; and/or (b) $NO_x$ reductive activity [e.g. under rich conditions].

The $NO_x$ treatment material comprises, or consists essentially of, a $NO_x$ treatment component.

Typically, the $NO_x$ treatment component (NTC) comprises a support material. The support material of the $NO_x$ treatment component (NTC) is referred to herein as the NTC support material.

The NTC support material comprises, or consists essentially of, ceria, or a mixed or composite oxide of ceria, such as a ceria-zirconia.

When the NTC support material comprises, or consists essentially of, a ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

In general, the $NO_x$ treatment component may comprise a platinum group metal (PGM) and/or a $NO_x$ storage component.

The $NO_x$ treatment component may comprise, or consist essentially of, a platinum group metal (PGM) disposed or supported (e.g. directly disposed or supported) on the first support material. The PGM may be selected from the group consisting of platinum, palladium, rhodium, a combination of platinum and palladium, a combination of platinum and rhodium, a combination of palladium and rhodium, and a combination of platinum, palladium and rhodium. It is preferred that the PGM is selected from the group consisting of palladium, rhodium and a combination of palladium and rhodium.

The PGM (i.e. of the $NO_x$ treatment component) may be rhodium. The PGM may be palladium. Preferably, the PGM is palladium.

Additionally or alternatively, the $NO_x$ treatment component may comprise, or consist essentially of, a $NO_x$ storage component disposed or supported (e.g. directly disposed or supported) on the NTC support material. The $NO_x$ storage component generally comprises, or consists essentially of, (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal, preferably a rare earth metal other than cerium (Ce). It is preferred that the $NO_x$ storage component comprises, or consists essentially of, an oxide, a carbonate or a hydroxide of an alkaline earth metal. The alkaline earth metal is preferably barium (Ba).

Catalytic Region Having DOC Activity

The second or third catalytic region may be for oxidising hydrocarbons (HCs) and/or nitric oxide (NO) in the exhaust gas produced by the diesel engine (e.g. the second or third catalytic region is a diesel oxidation catalytic region or has diesel oxidation catalyst (DOC) activity).

When the second or third catalytic region is for oxidising hydrocarbons (HCs) and/or nitric oxide (NO) in the exhaust gas produced by the diesel engine, the second or third catalytic region comprises platinum (Pt) and a support material. It is particularly preferred that the second or third catalytic region comprises, or consists essentially of, platinum (Pt), manganese (Mn) and a support material. The second or third catalytic region is for oxidising hydrocarbons (HCs) and/or nitric oxide (NO) in the exhaust gas produced by the diesel engine The platinum (Pt) is typically disposed or supported on the support material. The platinum may be disposed directly onto or is directly supported by the support material (e.g. there is no intervening support material between the platinum and the support material). For example, platinum can be dispersed on the support material.

The second or third catalytic region may further comprise palladium, such as palladium disposed or supported on the support material. When the second or third catalytic region comprises palladium, then the ratio of platinum to palladium by total weight is generally ≥2:1 (e.g. Pt:Pd 1:0 to 2:1), more preferably ≥4:1 (e.g. Pt:Pd 1:0 to 4:1).

It is generally preferred that the second or third catalytic region is substantially free of palladium, particularly substantially free of palladium (Pd) disposed or supported on the support material. More preferably, the second or third catalytic region does not comprise palladium, particularly palladium disposed or supported on the support material. The presence of palladium, particularly in a large amount, in the second catalytic region can be detrimental to NO oxidation activity. The NO oxidising activity of palladium is generally poor under the typical usage conditions for a diesel oxidation catalyst. Also, any palladium that is present may react with some of the platinum that is present to form an alloy. This can also be detrimental to the NO oxidation activity of the second catalytic region because platinum-palladium alloys are not as active toward NO oxidation as platinum is by itself.

Generally, the second or third catalytic region comprises platinum (Pt) as the only platinum group metal. The second or third catalytic region preferably does not comprise one or more other platinum group metals, such as ruthenium (Ru), rhodium (Rh), palladium (Pd), osmium (Os) and/or iridium (Ir).

The second or third catalytic region typically has a total loading of platinum of 5 to 300 g ft$^{-3}$. It is preferred that the second or third catalytic region has a total loading of platinum of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

It is preferable that a primary function of the second or third catalytic region is oxidising nitric oxide (NO) to nitrogen dioxide (NO$_2$). However, it is appreciated that in some embodiments of the oxidation catalyst, the second or third catalytic region will also oxidise some hydrocarbons (HCs) during use.

The second or third catalytic region may also comprise manganese (Mn). The manganese may be present in an elemental form or as an oxide. The second or third catalytic region typically comprises manganese or an oxide thereof.

The manganese (Mn) is typically disposed or supported on the support material. The manganese (Mn) may be disposed directly onto or is directly supported by the support material (e.g. there is no intervening support material between the Mn and the support material).

The second or third catalytic region typically has a total loading of manganese (Mn) of 5 to 500 g ft$^{-3}$. It is preferred that the second or third catalytic region has a total loading of manganese (Mn) of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

Typically, the second or third catalytic region comprises a ratio of Mn:Pt by weight of ≤5:1, more preferably <5:1.

In general, the second or third catalytic region comprises a ratio of Mn:Pt by weight of ≥0.2:1 (e.g. ≥0.5:1), more preferably >0.2:1 (e.g. >0.5:1).

The second or third catalytic region may comprise a ratio by total weight of manganese (Mn) to platinum of 5:1 to 0.2:1, such as 5:1 to 0.5:1 (e.g. 5:1 to 2:3 or 5:1 to 1:2), preferably 4.5:1 to 1:1 (e.g. 4:1 to 1.1:1), more preferably 4:1 to 1.5:1. The ratio of Mn:Pt by weight can be important in obtaining advantageous NO oxidation activity.

Typically, the support material comprises, or consists essentially of, a refractory oxide. The refractory oxide is typically selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The support material, or the refractory oxide thereof, may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the support material, or the refractory oxide thereof, is doped, the total amount of dopant is 0.25 to 5% by weight, preferably 0.5 to 3% by weight (e.g. about 1% by weight).

The support material, or the refractory oxide thereof, may comprise, or consist essentially of, alumina doped with a dopant. It is particularly preferred that the support material, or the refractory oxide thereof, comprises, or consists essentially of, alumina doped with a dopant. It has been found that the combination of manganese (Mn), platinum (Pt) and a doped alumina support material, particularly an alumina support material doped with silica, provides excellent NO oxidation activity and can stabilise NO oxidation activity of the oxidation catalyst over its lifetime.

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, cerium, or an oxide thereof; particularly silicon, cerium, or an oxide thereof. More preferably, the dopant comprises, or consists essentially of, silicon, magnesium, barium, or an oxide thereof; particularly silicon, magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium in an amount as defined above or an amount of 1 to 30% by weight (i.e. % by weight of the alumina), preferably 5 to 25% by weight.

It is preferred that the support material, or the refractory oxide thereof, is not doped with a dopant comprising, or consisting essentially of, manganese. Thus, the support material, or the refractory oxide thereof, is not promoted with a promoter, such as a promoter selected from the group consisting of tin, manganese, indium, group VIII metal (e.g. Fe, Co, Ni, Ru, Rh, Pd, Os, Ir and Pt, particularly Ir) and combinations thereof.

In general, when the support material, or the refractory oxide thereof, comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the support material, or refractory oxide thereof, comprises or consists essentially of ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

Typically, the second or third catalytic region comprises an amount of the support material of 0.1 to 4.5 g in$^{-3}$ (e.g. 0.25 to 4.0 g in$^{-3}$), preferably 0.5 to 3.0 g in$^{-3}$, more preferably 0.6 to 2.5 g in$^{-3}$ (e.g. 0.75 to 1.5 g in$^{-3}$).

In some applications, it may generally be preferable that the second or third catalytic region is substantially free of a hydrocarbon adsorbent material, particularly a zeolite. Thus, the second or third catalytic region may not comprise a hydrocarbon adsorbent material.

The second or third catalytic region typically does not comprise indium and/or iridium. More preferably, the second or third catalytic region does not comprise indium, iridium and/or magnesium.

It may be preferable that the second or third catalytic region does not comprise cerium oxide or a mixed or composite oxide thereof, such as (i) a mixed or composite oxide of cerium oxide and alumina and/or (ii) a mixed or composite oxide of cerium oxide and zirconia.

Additionally or alternatively, the second or third catalytic region may be substantially free of rhodium, an alkali metal and/or an alkaline earth metal, particularly an alkali metal and/or an alkaline earth metal disposed or supported on the support material. Thus, the second or third catalytic region may not comprise rhodium, an alkali metal and/or an alkaline earth metal, particularly an alkali metal and/or an alkaline earth metal disposed or supported on the support material.

Substrate

The oxidation catalyst of the invention comprises a substrate. The substrate typically has an inlet end and an outlet end.

In general, the substrate has a plurality of channels (e.g. for the exhaust gas to flow through). Generally, the substrate is a ceramic material or a metallic material.

It is preferred that the substrate is made or composed of cordierite (SiO$_2$—Al$_2$O$_3$—MgO), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art.

The substrate monolith may be a flow-through monolith. Alternatively, the substrate may be a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Exhaust System

The invention also provides an exhaust system comprising the oxidation catalyst and an emissions control device. Examples of an emissions control device include a diesel particulate filter (DPF), a lean NO$_x$ trap (LNT), a lean NO$_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the exhaust system comprises an emissions control device selected from the group consisting of a lean NO$_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the oxidation catalyst and upstream of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the exhaust system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment, the exhaust system comprises the oxidation catalyst of the invention and a catalysed soot filter (CSF). The oxidation catalyst may comprise a second catalytic region having PNA, LNT and/or DOC activity. The oxidation catalyst is typically followed by (e.g. is upstream of) the catalysed soot filter (CSF). Thus, for example, an outlet of the oxidation catalyst is connected to an inlet of the catalysed soot filter.

A second exhaust system embodiment relates to an exhaust system comprising the oxidation catalyst of the invention, a catalysed soot filter (CSF) and a selective catalytic reduction (SCR) catalyst. The oxidation catalyst may comprise a second catalytic region having PNA, LNT and/or DOC activity. Such an arrangement is a preferred exhaust system for a light-duty diesel vehicle.

The oxidation catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third exhaust system embodiment, the exhaust system comprises the oxidation catalyst of the invention, a selective catalytic reduction (SCR) catalyst and either a catalysed soot filter (CSF) or a diesel particulate filter (DPF). The oxidation catalyst may comprise a second catalytic region having PNA, LNT and/or DOC activity.

In the third exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth exhaust system embodiment comprises the oxidation catalyst of the invention and a selective catalytic reduction filter (SCRF™) catalyst. The oxidation catalyst of the invention is typically followed by (e.g. is upstream of) the selective catalytic reduction filter (SCRF™) catalyst. The oxidation catalyst may comprise a second catalytic region having PNA, LNT and/or DOC activity.

A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

When the exhaust system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

In general, the exhaust system of the invention may comprise a hydrocarbon supply apparatus (e.g. for generating a rich exhaust gas), particularly when the second catalytic region of the oxidation catalyst has LNT activity. The hydrocarbon supply apparatus may be disposed upstream of the catalyst of the invention. The hydrocarbon supply apparatus is typically disposed downstream of the exhaust outlet of the diesel engine.

The hydrocarbon supply apparatus may be electronically coupled to an engine management system, which is configured to inject hydrocarbon into the exhaust gas for releasing $NO_x$ (e.g. stored $NO_x$) from the catalyst.

The hydrocarbon supply apparatus may be an injector. The hydrocarbon supply apparatus or injector is suitable for injecting fuel into the exhaust gas.

Alternatively or in addition to the hydrocarbon supply apparatus, the diesel engine may comprise an engine management system (e.g. an engine control unit [ECU]). The engine management system is configured for in-cylinder injection of the hydrocarbon (e.g. fuel) for releasing $NO_x$ (e.g. stored $NO_x$) from the catalyst.

Generally, the engine management system is coupled to a sensor in the exhaust system, which monitors the status of the catalyst. Such a sensor may be disposed downstream of the catalyst. The sensor may monitor the $NO_x$ composition of the exhaust gas at the outlet of the catalyst.

In general, the hydrocarbon is fuel, preferably diesel fuel.

Vehicle

Another aspect of the invention relates to a vehicle. The vehicle comprises a diesel engine. The diesel engine is coupled to an exhaust system of the invention.

It is preferred that the diesel engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of 8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "adsorber" as used herein, particularly in the context of a $NO_x$ adsorber, should not be construed as being limited to the storage or trapping of a chemical entity (e.g. $NO_R$) only by means of adsorption. The term "adsorber" used herein is synonymous with "absorber".

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The acronym "PGM" as used herein refers to "platinum group metal".

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a washcoat region, a washcoat layer or a washcoat zone, means that the material in a minor amount, such as ≤5% by weight, preferably ≤2% by weight, more preferably ≤1% by weight. The expression "substantially free of" embraces the expression "does not comprise".

The expression "about" as used herein with reference to an end point of a numerical range includes the exact end point of the specified numerical range. Thus, for example, an expression defining a parameter as being up to "about 0.2" includes the parameter being up to and including 0.2.

Any reference to an amount of dopant, particularly a total amount, expressed as a % by weight as used herein refers to the weight of the support material or the refractory oxide thereof.

The term "selective catalytic reduction filter catalyst" as used herein includes a selective catalytic reduction formulation that has been coated onto a diesel particulate filter (SCR-DPF), which is known in the art.

EXAMPLES

The invention will now be illustrated by the following non-limiting examples.

Example 1

Iron nitrate was dissolved in water and impregnated onto an alumina powder using an incipient wetness method. The material was dried at 105° C. then calcined at 500° C. The calcined powder was co-impregnated with platinum nitrate and palladium nitrate solutions by an incipient wetness method. The material was dried at 105° C. then calcined at 500° C. The final catalyst powder had a PGM loading of 2.5 wt % in a Pt:Pd ratio of 10:1 w/w. The Fe loading was 5 wt %.

Example 2

Iron nitrate was dissolved in water and impregnated onto an alumina powder using an incipient wetness method. The material was dried at 105° C. then calcined at 500° C. The calcined powder was co-impregnated with platinum nitrate and palladium nitrate solutions by an incipient wetness method. The material was dried at 105° C. then calcined at 500° C. The final catalyst powder had a PGM loading of 2.5 wt % in a Pt:Pd ratio of 4:1 w/w. The Fe loading was 5 wt %.

Example 3 (Reference)

Alumina powder was co-impregnated with platinum nitrate and palladium nitrate solutions by an incipient wetness method. The material was dried at 105° C. then calcined at 500° C. The final catalyst powder had a PGM loading of 2.5 wt % in a Pt:Pd ratio of 10:1 w/w.

Example 4 (Reference)

Alumina powder was co-impregnated with platinum nitrate and palladium nitrate solutions by an incipient wetness method. The material was dried at 105° C. then calcined at 500° C. The final catalyst powder had a PGM loading of 2.5 wt % in a Pt:Pd ratio of 4:1 w/w.

Experimental Results

The catalysts of Examples 1 to 4 were hydrothermally aged in an oven at 750° C. for 15 hours using 10% water. The catalytic activity was determined using a synthetic gas bench catalytic activity test (SCAT). 0.4 g of aged catalyst powder in the size fraction of 255 to 350 microns was tested in a simulated exhaust gas mixture shown in Table 1. In each case the balance is nitrogen. The oxidation activities for CO and HC are determined by the light off temperature whereby 50% conversion is achieved (T50). SCAT results are shown in Table 2.

TABLE 1

| | |
|---|---|
| CO | 1500 ppm |
| HC (as $C_1$) | 480 ppm |
| NO | 150 ppm |
| $CO_2$ | 5% |
| $H_2O$ | 5% |
| $O_2$ | 14% |
| Gas hourly space velocity | 28000 ml/hr/ml |

TABLE 2

| Example No. | T50 CO aged condition (° C.) | T50 HC aged condition (° C.) | NO Oxidation at 250° C. aged condition (%) |
|---|---|---|---|
| 1 | 136 | 165 | 76 |
| 2 | 150 | 172 | 58 |
| 3 | 190 | 198 | 65 |
| 4 | 172 | 178 | 71 |

Table 2 shows the CO and HC T50 light off temperatures for Examples 1 to 4. Examples 1 and 2 have lower light off temperatures than Examples 3 and 4 respectively. Without the presence of Fe, the results for Examples 3 and 4 show that a ratio of Pt:Pd of 4:1 has lower T50 light off temperatures for CO and HC than a ratio of Pt:Pd of 10:1. However, when comparing Example 2 with Example 1, it can be seen that the promotional effect of Fe is lessened when the ratio of Pt:Pd is reduced from 10:1 to 4:1.

For the avoidance of any doubt, the entire content of any and all documents cited herein is incorporated by reference into the present application.

The invention claimed is:

1. An oxidation catalyst for treating an exhaust gas produced by a diesel engine comprising a catalytic region and a substrate, wherein the catalytic region comprises a catalytic material comprising:
   iron (Fe) or an oxide thereof, having a mean particle size of 10 nm or greater;
   a platinum group metal (PGM) selected from the group consisting of (i) platinum (Pt), (ii) palladium (Pd) and (iii) platinum (Pt) and palladium (Pd); and
   a support material, which is a refractory oxide comprising alumina;
   wherein the platinum group metal (PGM) and the iron (Fe) or an oxide thereof is each supported on the support material.

2. The oxidation catalyst of claim 1, wherein the refractory oxide is a mixed or composite oxide comprising alumina selected from the group consisting of silica-alumina, ceria-alumina, titania-alumina, zirconia-alumina and alumina-magnesia.

3. The oxidation catalyst of claim 1, wherein the refractory oxide is alumina.

4. The oxidation catalyst of claim 1, wherein the refractory oxide is a particulate refractory oxide, and the iron or an oxide thereof is dispersed over a surface of the particulate refractory oxide.

5. The oxidation catalyst of claim 1, wherein the iron has a mean particle size of 15 nm or greater.

6. The oxidation catalyst of claim 1, wherein the catalytic region comprises iron in an amount of 0.1 to 15.0% by weight.

7. The oxidation catalyst of claim 1, wherein the catalytic region has a total loading of iron of 1 to 500 g ft$^3$.

8. The oxidation catalyst of claim 1, wherein the platinum group metal (PGM) is platinum (Pt).

9. The oxidation catalyst of claim 1, wherein the platinum group metal (PGM) is platinum (Pt) and palladium (Pd).

10. The oxidation catalyst of claim 1, wherein the catalytic material comprises a ratio by weight of the platinum group metal (PGM) to iron (Fe) of 10:1 to 1:10.

11. The oxidation catalyst of claim 1, wherein the catalytic region further comprises a hydrocarbon adsorbent material, which is a zeolite.

12. The oxidation catalyst of claim 1, wherein the catalytic region is disposed on the substrate.

13. The oxidation catalyst of claim 1, wherein the catalytic region is a first catalytic region and the oxidation catalyst further comprises a second catalytic region.

14. The oxidation catalyst of claim 13, wherein the first catalytic region is a first catalytic layer and the second catalytic region is a second catalytic layer, and either (a) first catalytic layer is disposed on the second catalytic layer or (b) the second catalytic layer is disposed on the first catalytic layer.

15. The oxidation catalyst of claim 13, wherein the first catalytic region is a first catalytic zone and the second catalytic region is a second catalytic zone, and wherein either (a) the first catalytic zone is disposed upstream of the second catalytic zone or (b) the second catalytic zone is disposed upstream of the first catalytic zone.

16. The oxidation catalyst of claim 13, wherein the first catalytic region is disposed on the second catalytic region, and either (a) the second catalytic region is a second catalytic layer and the first catalytic region is a first catalytic zone, and wherein an entire length of the first catalytic zone is disposed on the second catalytic layer or (b) the second catalytic region is a second catalytic zone and the first catalytic region is a first catalytic zone or a first catalytic layer, and wherein the first catalytic zone or the first catalytic layer is disposed on the second catalytic zone.

17. The oxidation catalyst of claim 13, wherein the second catalytic region is disposed on the first catalytic region, and either (a) the first catalytic region is a first catalytic layer and the second catalytic region is a second catalytic zone, and wherein an entire length of the second catalytic zone is disposed on the first catalytic layer or (b) the first catalytic region is a first catalytic zone and the second catalytic region is a second catalytic zone or a second catalytic layer, and wherein the second catalytic zone or the second catalytic layer is disposed on the first catalytic zone.

18. The oxidation catalyst of claim 1, wherein the substrate is a flow-through monolith or a filtering monolith.

19. An exhaust system for treating an exhaust gas produced by a diesel engine, wherein the exhaust system comprises the oxidation catalyst of claim 1.

* * * * *